US011779006B2

(12) United States Patent
Ballu

(10) Patent No.: US 11,779,006 B2
(45) Date of Patent: Oct. 10, 2023

(54) SPRAYING ASSEMBLY, AND SPRAYER EQUIPPED WITH AT LEAST ONE SUCH ASSEMBLY

(75) Inventor: Patrick Ballu, Reims (FR)

(73) Assignee: EXEL INDUSTRIES, Epernay (FR)

( * ) Notice: Subject to any disclaimer, the term of this patent is extended or adjusted under 35 U.S.C. 154(b) by 1129 days.

(21) Appl. No.: 13/818,281

(22) PCT Filed: Apr. 28, 2011

(86) PCT No.: PCT/FR2011/050965
§ 371 (c)(1),
(2), (4) Date: May 5, 2013

(87) PCT Pub. No.: WO2005/048704
PCT Pub. Date: Jun. 2, 2005

(65) Prior Publication Data

US 2013/0233940 A1 Sep. 12, 2013

(30) Foreign Application Priority Data

Aug. 31, 2010 (FR) ...................................... 10 56896

(51) Int. Cl.
*A01M 7/00* (2006.01)
*B05B 7/32* (2006.01)
(Continued)

(52) U.S. Cl.
CPC ............. *A01M 7/0092* (2013.01); *B05B 7/32* (2013.01); *B05B 15/58* (2018.02);
(Continued)

(58) Field of Classification Search
CPC .... A01M 7/0092; B05B 15/58; B05B 15/531; B05B 7/32; B05B 12/1409;
(Continued)

(56) References Cited

U.S. PATENT DOCUMENTS 3,018,058 A 1/1962 Koller
4,033,481 A * 7/1977 Hicks ...................... B29B 7/603 222/134
(Continued)

FOREIGN PATENT DOCUMENTS

CA 2075040 8/1991
CH 375557 A 2/1964
(Continued)

*Primary Examiner* — Christopher R Dandridge
*Assistant Examiner* — Juan C Barrera
(74) *Attorney, Agent, or Firm* — Davidson, Davidson & Kappel, LLC

(57) ABSTRACT

A spraying assembly is provided. The spraying assembly includes at least one nozzle for liquid that is to be sprayed, and at least one active substance injector which is situated directly upstream from the at least one nozzle and to which liquid to be sprayed is supplied by a pump or a pressurized reservoir, with interposition of an obturator on a conduit connecting the pump or the pressurized reservoir to the injector. The spraying assembly also includes an outlet valve for each injector designed to close each outlet orifice. The present invention avoids overdosing or underdosing of the product that is to be sprayed as active substance.

28 Claims, 2 Drawing Sheets

(51) Int. Cl.
*B05B 15/58* (2018.01)
*B05B 12/14* (2006.01)
*B05B 15/531* (2018.01)

(52) U.S. Cl.
CPC ......... *B05B 12/1409* (2013.01); *B05B 15/531* (2018.02); *Y10T 137/0419* (2015.04)

(58) Field of Classification Search
CPC . B05B 12/1418; B05B 7/2494; B05B 7/2497; B05B 7/26; B05B 7/28; B05B 15/00; Y10T 137/0419
USPC ..... 239/102.2, 398–432, 146–176, 407, 413, 239/419; 137/3, 99
See application file for complete search history.

(56) References Cited

U.S. PATENT DOCUMENTS 4,315,600 A 2/1982 Rhoades et al.
4,364,516 A 12/1982 Rhoades et al.
4,397,422 A * 8/1983 Gwyn ........................... 239/307
4,580,721 A 8/1986 Coffee et al.
4,917,304 A * 4/1990 Mazzei et al. .................. 239/64
5,004,155 A * 4/1991 Dashevsky ......... A01M 7/0092 239/127
5,016,817 A 5/1991 Ghates et al.
5,135,174 A 8/1992 Chaplinsky et al.
5,314,120 A * 5/1994 Nau et al. ..................... 239/310
5,370,274 A * 12/1994 Ohmi ........................ B05B 7/28 222/135
5,370,734 A * 12/1994 Ferrero .................... A21C 9/04 118/13
6,012,649 A 1/2000 Riddell et al.
6,314,979 B1 * 11/2001 Lips ..................... A01C 23/042 137/205.5
RE38,281 E * 10/2003 Tisone .................. B01L 3/0265 118/305
6,786,425 B2 * 9/2004 Rawlings .............. B05B 1/3013 239/550
6,805,307 B2 * 10/2004 Dorendorf ............ B05B 7/0416 239/318
6,820,828 B1 * 11/2004 Greenwait ........... A01G 25/092 239/726
6,848,391 B1 * 2/2005 Allen .................... B01F 3/1228 118/19
8,920,752 B2 * 12/2014 Tisone ................. B01J 19/0046 422/501
2002/0030119 A1 * 3/2002 Proharam ..................... 239/168
2003/0024485 A1 * 2/2003 Freidell ................ A01K 13/001 119/665
2003/0127534 A1 * 7/2003 Firestone ................ B01F 3/088 239/61
2006/0261188 A1 * 11/2006 Ito et al. ....................... 239/306
2006/0286290 A1 * 12/2006 Wanthal ................ B05B 7/0025 427/8
2007/0040050 A1 2/2007 Wichmann
2008/0078843 A1 * 4/2008 Wichmann .............. F04B 13/00 239/1
2008/0230624 A1 * 9/2008 Giles ................... F16K 31/0655 239/69
2009/0134237 A1 * 5/2009 Giles ................................ 239/8
2012/0000991 A1 1/2012 Hloben

FOREIGN PATENT DOCUMENTS

CN 201565393 1/2010
DE 4027188 3/1991
DE 4236062 4/1993
DE 9402611 4/1994
DE 3885828 6/1994
DE 19519432 11/1996
DE 19530968 2/1997
DE 10312930 10/2004
DE 102004047585 3/2006
DE 69126019 1/2007
DE 60310919 9/2007
DE 102007030043 1/2009
DE 102008002739 12/2009
EP 0308154 11/1993
EP 1378293 1/2004
EP 1507739 1/2007
EP 1906013 4/2008
EP 1906019 4/2008
EP 2076329 6/2016
FR 1481223 5/1967
GB 22451541 9/1991
GB 2260682 4/1993
WO 9011010 A1 10/1990
WO 2005048704 A2 6/2005
WO 2008051815 5/2008
WO 2011034370 A2 3/2011

* cited by examiner

SPRAYING ASSEMBLY, AND SPRAYER EQUIPPED WITH AT LEAST ONE SUCH ASSEMBLY

The present invention relates to a spraying assembly, and a sprayer equipped with at least one such assembly.

BACKGROUND

A traditional agricultural sprayer, for example a tractor, includes a ramp equipped with a plurality of spray nozzles connected to ducts in which a liquid product to be sprayed on the plants to be treated circulates. The plants to be treated may be of any type, and the term "agricultural" is to be understood here in the broad sense, in particular including arboricultural crops.

In the case of a direct injection spraying system, an active liquid or powdery material is incorporated or mixed into the liquid to be sprayed (in general clean water) upstream of the ramp, over the course of the spraying, as considered in WO-A-90/11010, where a ball-shaped check valve is installed at the outlet of a dosing pump relatively remote from the nozzles it supplies.

Such a system has a certain number of drawbacks.

When the sprayer slows down, the flow rate of the injection of active substance into the liquid to be sprayed decreases.

However, in particular in the case of a very long ramp, the liquid with a smaller dose of active substance takes some time to reach the nozzles, and during that time the plants are overdosed with active substance. The ramp causes inertia in the dosing of the mixture of active substance and liquid to be sprayed.

Conversely, when the sprayer accelerates, the injection flow rate of active substance into the liquid to be sprayed increases.

The liquid with a higher dose of the active substance takes some time to reach the nozzles, and during that time, the plants are underdosed with active substance.

Furthermore, during the modification of the speed of the sprayer, these overdosing or underdosing phenomena overlap, which accumulates, amplifying them and their respective negative effects described above.

It has also been possible to observe that the overdosing or underdosing phenomena were irregular and asynchronous, depending on the distance of each nozzle relative to the point of the incorporation of the active substance into the liquid to be sprayed, in particular in the case of very long ramps.

Furthermore, when the spraying is restarted by a ramp segment comprising several nozzles after a temporary interruption in that spraying, the liquid that initially flows in the duct results from dosing done before that interruption. However, such dosing generally does not correspond to the required dosing after that restart, since the speed of the sprayer changes relatively often.

WO-A-2005/048704 describes a spraying assembly comprising a nozzle for projecting a liquid to be sprayed and active substance pumps that are located directly upstream of the nozzle, to introduce the active substance into a mixing area with the liquid to be sprayed.

However, the pumping chamber of each active substance pump is in permanent fluid communication with said mixing zone. Yet although the volume of that pumping chamber is substantially smaller than the volume of the ramp, it also causes a certain volume inertia in the dosing of the mixture to be produced, which prevents the spraying assembly from making quick, or even instantaneous, variations in the concentration of said mixture and leads to overdoses.

SUMMARY OF THE INVENTION

An objection of the present invention aims to resolve these drawbacks by proposing a spraying assembly and a sprayer that are very reactive and reliable, and relatively easy to adjust remotely, potentially electronically.

To that end, the present invention provides a spraying assembly comprising at least one nozzle for liquid that is to be sprayed, and at least one active substance injector into the liquid that is to be sprayed, the injector being situated directly upstream from at least one nozzle and supplied with liquid to be sprayed by means of a pump or a pressurized reservoir, with interposition of an obturator on a conduit connecting the pump or the pressurized reservoir to the injector. This assembly additionally comprises, for each injector, an outlet valve designed to close the or each outlet orifice.

Within the meaning of the present invention, the injector is situated directly upstream from the or each nozzle, i.e., the flow path of the active substance between the outlet of the injector and the nozzle has a length of only several centimeters.

Owing to these features, the assembly according to the invention makes it possible to incorporate the active substance into the liquid to be sprayed at the last minute, i.e. just upstream from a nozzle or a group of nozzles, and therefore just before the actual spraying of that liquid.

It is therefore possible to adjust the dosing of active substance in the liquid to be sprayed instantaneously, and consequently to avoid the overdoses or underdoses observed in the prior art.

According to other advantageous, but optional, features of the spraying assembly according to the invention, any one of the following features may be considered alone or according to any technically allowable combination:

- the or each outlet valve is a needle adapted to come alongside a seat formed at the outlet orifice;
- the or each nozzle and the or each injector are mounted on the same body or two adjacent bodies, a mixture of the liquid to be sprayed with the active substance occurring through turbulence in the or each body;
- this assembly comprises a plurality of injectors situated directly upstream from the or each nozzle;
- this assembly comprises means for remotely controlling each injector and/or each outlet valve, and the or each injector and/or the or each outlet valve can be actuated remotely;
- the or each injector is chosen from the group comprising a valve or pump of the ceramic, electromagnetic, piezoelectric or peristaltic type;
- the assembly comprises means for injecting air into each injector.

The present invention also provides a sprayer equipped with at least one assembly according to the present invention, comprising at least one primary conduit designed to supply the or each nozzle with liquid to be sprayed, and at least one secondary conduit designed to supply the or each injector with active substance.

According to other advantageous, but optional, features of the sprayer according to the invention, any one of the following features may considered alone or according to any technically allowable combination:

- the sprayer comprises a plurality of secondary conduits respectively supplying each injector;

- the sprayer comprises means for keeping the pressure of the liquid to be sprayed constant directly upstream of the or each nozzle;
- the sprayer comprises means for regulating the flow rate of active substance in the or each body;
- the sprayer comprises regulating means adapted to regulate the flow rate of active substance in each injector as a function of the displacement speed of the sprayer and/or the state of the plant surface to be treated, for example depending on whether the plants to be sprayed are healthy or in poor health;
- each means for maintaining the pressure of the liquid to be sprayed and each means for regulating the flow rate can be actuated individually and independently;
- the or each injector comprises a pump or a piezoelectric, electromagnetic or peristaltic valve, and the control means are adapted to vary the operating speed of the pump or the valve so as to drive the flow rate thereof; and
- at least one of the secondary conduits is adapted to convey a first type of active substance, for example an herbicide (potentially selective, and therefore dangerous for other crops), and at least one other of the secondary conduits is adapted to convey a second type of active substance, for example an insecticide, a fungicide, or a wetting agent;
- the or each primary conduit includes at least one valve to control the circulation of liquid to be sprayed and the or each secondary conduit includes at least one obturator to control the circulation of active substance, the or each valve and the or each obturator being able to be actuated remotely.

The present invention also provides a method for cleaning a spraying assembly in which means are provided for injecting air into each injector through its outlet orifice. This method comprises steps consisting of injecting a quantity of air into each injector, countercurrent from the direction of flow of the liquid to be sprayed in that injector, and pushing part of the liquid to be sprayed that is present in that injector and in its supply means back toward a storage reservoir for the product to be sprayed.

BRIEF DESCRIPTION OF THE DRAWINGS

The present invention will be well understood, and advantages thereof will also emerge, in light of the following description, provided solely as a non-limiting example, in reference to the appended drawings, in which.

DETAILED DESCRIPTION

Figure 1:
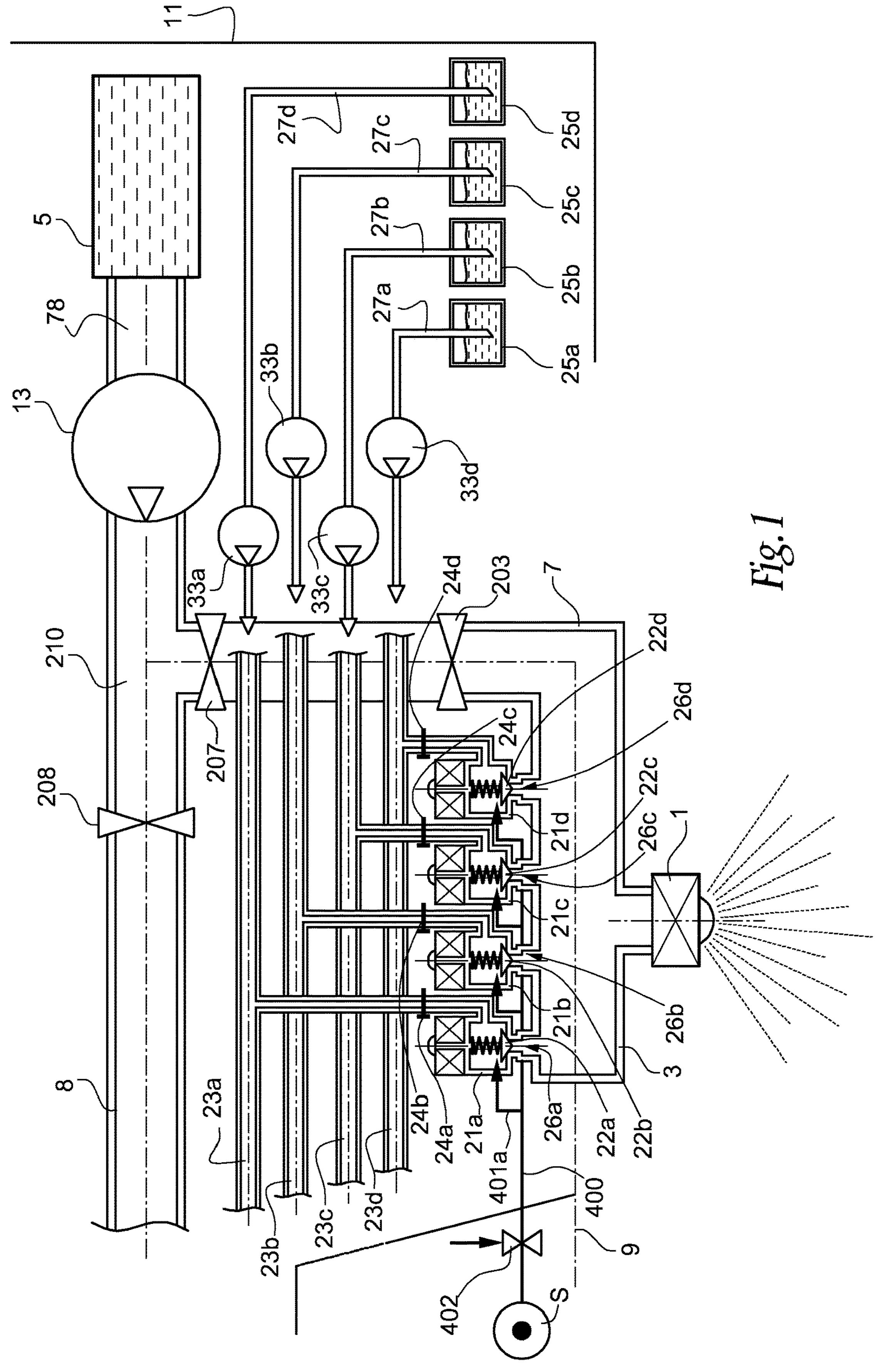
FIG. 1 is a diagram of the spraying assembly according to a first embodiment of the invention.

FIG. 1 shows a nozzle 1 mounted on a body 3 connected to a primary vat 5 by means of a shared conduit 78 and a primary conduit 7. The inlet of the shared conduit 78 is connected on the primary vat 5. The primary conduit 7 emerges in the body 3.

The term “connect” relates to a fluid communication, which means a conduit allowing the fluid to circulate between two components of a spraying assembly, for example between the primary vat 5 and the body 3. Such a conduit may be embodied by a flexible hose, a rigid tube, or any other known equivalent means.

Alternatively, the or each nozzle 1 and the or each injector 21*a* to 21*d* may be mounted on two adjacent bodies 3, i.e. close to one another.

The or each body 3 is adapted to produce a mixture of the liquid to be sprayed with the active substance. To that end, the or each body 3 may be equipped with a static mixer, baffles and/or propellers, etc. A valve 203 is arranged on the primary conduit 7 so as, if necessary, to prevent said mixture from returning into the primary conduit 7. Alternatively, the valve 203 may be replaced by a check valve.

The body 3 is in turn mounted on a spraying ramp structure 9.

The primary vat 5 and the ramp 9 are mounted on the chassis 11 of an agricultural sprayer, such as a tractor or trailer.

A primary pump 13 is arranged on the shared conduit 78 between the primary vat 5 and the body 3. The conduit 78 is said to be shared because it emerges, by means of a T coupling 210, on the one hand on the primary conduit 7 and on the other hand on a return conduit 8 designed to allow the liquid to be sprayed to circulate up to the primary vat 5.

The first spraying assembly includes a valve 207 and a valve 208 respectively arranged on the primary conduit 7 and on the return conduit 8 to control the circulation of liquid to be sprayed therein.

The valves 203, 207 and 208 are driven into the open position or closed position by suitable electrical means.

When the valve 207 is open, the liquid to be sprayed circulates in the primary conduit 7. When the valve 207 is closed, the liquid to be sprayed does not circulate in the primary conduit 7.

Likewise, when the valve 208 is open, the liquid to be sprayed circulates in the return conduit 8. When the valve 208 is closed, the liquid to be sprayed does not circulate in the return conduit 8, but flows in the primary conduit 7 if the valve 207 is open.

This spraying assembly can thus operate through recirculation, in particular to keep the liquid in motion even after having temporarily, partially or completely, interrupted the spraying thereof.

Several injectors 21*a*, 21*b*, 21*c* and 21*d*, four in the illustrated example, are mounted on the body 3 and each respectively connected to a secondary vat 25*a*, 25*b*, 25*c* and 25*d* by secondary conduits 27*a*, 27*b*, 27*c* and 27*d*.

Respective pumps 33*a*, 33*b*, 33*c* and 33*d* are located on the secondary conduits 27*a* to 27*d*.

The injectors 21*a* to 21*d* may be valves or may be ceramic or electromagnetic or piezoelectric pumps. Each of the injectors 21*a* to 21*d* can be actuated remotely, i.e., it may be controlled by suitable and remote electrical means.

Each injector 21*a*, 21*b*, 21*c* and 21*d* also includes a respective obturator or check valve 24*a*, 24*b*, 24*c* and 24*d*, in which a corresponding secondary conduit 23*a*, 23*b*, 23*c* and 23*d* is arranged so as to cut the supply.

Furthermore, the spraying assembly comprises outlet valves that are respectively arranged close to and downstream from each injector 21*a* to 21*d* so as to close off the outlet orifice 26*a* to 26*d* thereof. Each outlet valve is made up of a needle 22*a* to 22*d* with a conical, flat, or piston shape, adapted to come alongside a seat or bore with a complementary shape that is formed at the corresponding outlet orifice 26*a* to 26*d*.

Each needle 22*a* to 22*d* serves to allow or stop the fluid communication between the specific volume of the injector 21*a* to 21*d* able to contain active substance and the nozzle 1 or, more specifically, the body 3.

FIG. 1 shows a single body 3 supporting a single nozzle 1 and four injectors 21*a* to 21*d*, but the ramp 9 may be provided with a plurality of bodies 3 each supporting one or more nozzles 1 and one or more injectors 21.

Each of the bodies 3 is in fluid communication with the primary conduit 7, and each of the injectors 21 is in fluid communication with a secondary conduit 23 concerning it.

Means for creating turbulence are provided in the body 3. They favor mixing by turbulence between the liquid to be sprayed and the active substance leaving an injector 21.

Typically, the bodies 3 may be distributed at regular or irregular intervals as needed, for example every 50 cm on the ramp 9.

Alternatively, the bodies 3 may be mounted on independent segments of the ramp 9. A "segment" is a group of standard nozzles 1 that are successively arranged along the ramp 9 or juxtaposed on an independent branch, and whereof the nozzles can be controlled and operate simultaneously, when they are not controlled individually.

In a first embodiment, the secondary pumps 33 are typically adapted to generate a liquid pressure in the secondary conduits 23*a* to 23*d* that is higher than that prevailing in the primary conduit 7 and the body 3. This pressure may for example be approximately 10 bars.

In a second embodiment, there are no more pumps 33 and the cans 25 are kept at a slight overpressure, of several decibars, relative to the spraying pressure generated by the primary pump 13. This may for example be obtained using pneumatic or hydraulic pressure exchangers, with pistons or membranes but with different sections, situated between the circuits 7 and 23.

In order to control the size and spectrum of the sprayed crops, the agricultural sprayer also comprises means for keeping the pressure of the liquid to be sprayed constant directly upstream from each nozzle 1. Such means may for example be made up of valve or membrane regulators or other known equivalent means. The terms "upstream" and "downstream" refer to the flow direction of the considered fluid, i.e., the liquid to be sprayed, the active substance, or the mixture thereof.

The agricultural sprayer also comprises means for example, a regulator or valve, for regulating the flow rate of active substance in each secondary conduit 23*a* to 23*d*. The supply of each injector 21*a* to 21*d* with active substance therefore depends on these regulating means or regulators.

Such means for regulating the flow rate of the active substance, as well as the obturators 24*a* to 24*d* (in all or nothing mode), or the injectors 21 (in discrete variation mode, by electrical pulses) controlling the supply of liquid to be sprayed, may be controlled as a function of data supplied by a global positioning system (of the GPS type) or an onboard camera on the ramp or the agricultural vehicle coupled to an image processing system.

Such an image processing system makes it possible to detect adventives to be destroyed or to use the color of the plant to evaluate its needs with respect to the active substance for growth, such as fertilizers or growth regulators.

Furthermore, the active substance circuits may have structures and/or arrangements that differ as a function of the type of active substance they are respectively designed to convey.

Thus, each secondary vat 25*a* to 25*d* can be adapted to receive a predetermined type of active substance and each secondary conduit 23*a* to 23*d* may be adapted to convey the corresponding type of active substance.

For example, the secondary duct 23*a* may be reserved to convey only selective herbicides (dangerous for other crops), while the secondary conduit 23*d* may rather be adapted to convey fungicides or insecticides (the residues of which are not harmful for other crops).

Such means may be adapted to regulate the flow rate of active substance in proportion to the speed of travel of the sprayer and/or the plant surface to be treated. The plant surface to be treated may be evaluated using an onboard camera on the ramp or the agricultural vehicle coupled to an image processing system.

In the case where each injector 21*a* to 21*d* comprises a valve or an electromagnetic or piezoelectric pump, said regulating means are formed by an electronic circuit adapted to vary the vibrational frequency of each injector 21*a* to 21*d*.

The operating mode and the advantages of the present invention result directly from the preceding description.

A liquid to be sprayed is placed in the primary vat 5. This may be either clean water, or a mixture of clean water and a phytosanitary product, or potentially a liquid fertilizer, which must be sprayed in pure state and at a large volume per hectare.

During operation, the primary pump 13 sends the liquid to be sprayed into all of the bodies 3 distributed on the ramp 9, thereby allowing that liquid to be sprayed by the nozzles.

The pump 13 may be of the displacement, constant pressure or constant flow rate type. It may have pistons, membranes, a centrifuge, or other means.

With the injector devices 21, which directly regulate the quantity of active substance per hectare, the pump 13 is kept at a constant pressure. This pressure is selected, in association with the type of nozzles installed, to generate drops with a predetermined size and spectrum, not modified by the speed of travel or the quantity of active substance introduced by the injectors 21.

Exceptionally, when it is preferable to use the sprayer traditionally, without using the injectors 21/221, the pump 13 may then be interfaced with a braking system of the DPA (output proportional to forward speed) type, which makes it possible to adapt the liquid flow rate in the primary conduit 7 as a function of the forward speed of the sprayer.

Mixtures containing active substances designed to be incorporated into the liquid to be sprayed are placed in the secondary vats 25*a* to 25*d*.

This incorporation is done by acting on the secondary pumps 33*a* to 33*d*, selectively or simultaneously. This incorporation may also be done by placing the vats 25*a* to 25*d* under air pressure, or under hydrostatic pressure using pressure exchangers, as mentioned above, inasmuch as pumps 33*a* to 33*d* are not used, but the injectors 21/221 are rather used directly, which then act as simple dosers.

In so doing, the injectors 21*a* to 21*d* inject the concerned mixtures of active substances into the body 3, i.e. just upstream from the nozzle 1.

These active substances are therefore incorporated into the liquid coming from the primary vat 5 immediately before spraying, and therefore sprayed on the plants to be treated taking the forward travel speed of the sprayer into account, which prevents overdoses and underdoses.

Figure 2:
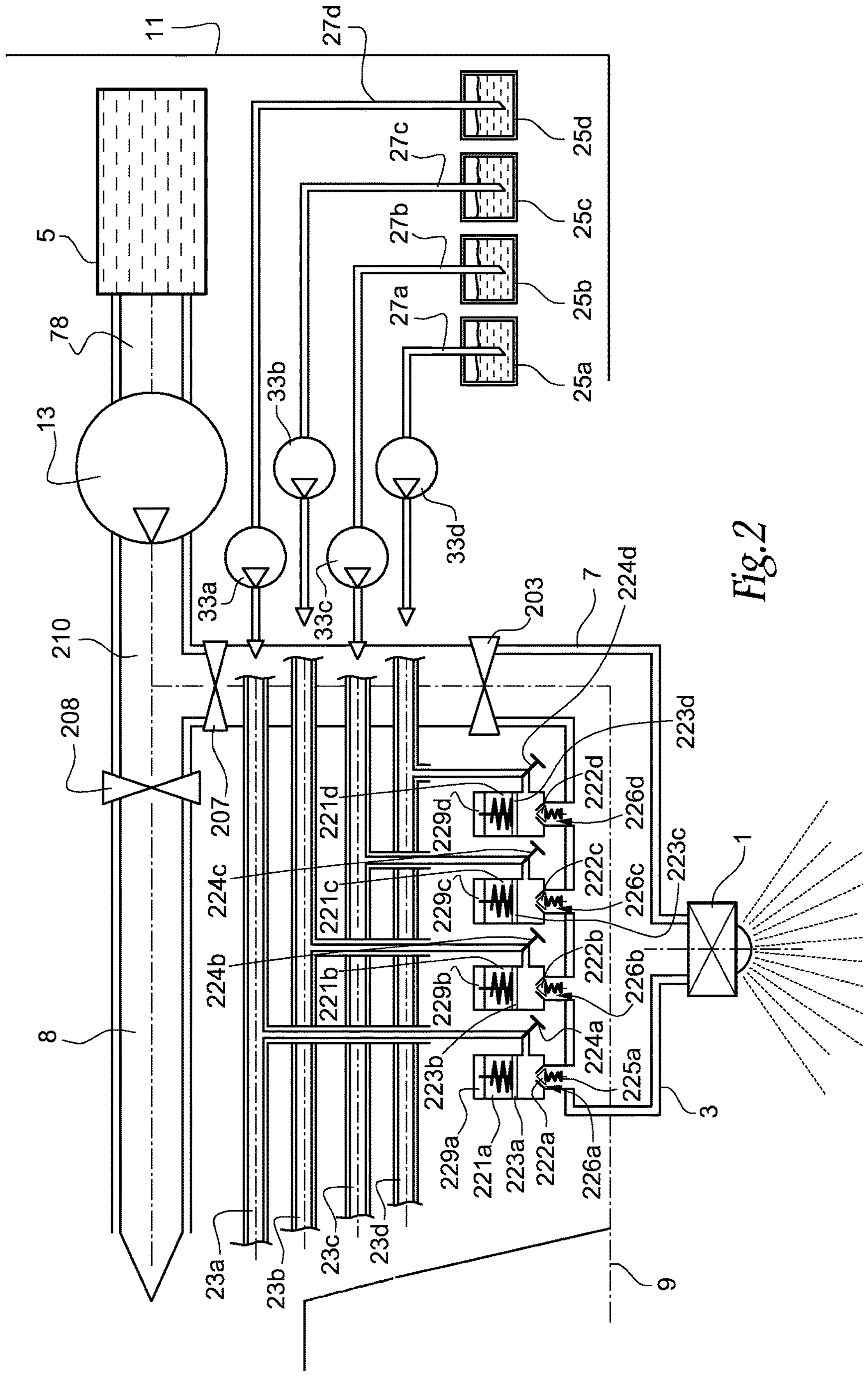
FIG. 2 is a diagram similar to FIG. 1 of a spraying assembly according to a second embodiment of the invention.

FIG. 2 shows a second spraying assembly as an alternative to the first spraying assembly illustrated in FIG. 1. In FIG. 2, the components of the second spraying assembly that have a structure and function identical to the components of the first spraying assembly bear the same numerical references and operate comparably, with the exception of the differences indicated below.

Each indicator 221*a* to 221*d* of this embodiment comprises a piston 223*a* and 223*d*, controlled by a piezoelectric component 229*a* to 229*d* arranged inside the body of the injector, which is only partially shown in FIG. 2. This makes it possible to form, within each injector, a piezoelectric micro-pump capable of delivering a predetermined quantity of liquid to the nozzle 1, proportional to its vibrational frequency. In practice, each piston 223_a_ and 223_d_ can be made up of one or more surfaces of the piezoelectric component, since the vibrations of such a component cause alternating translations of its surfaces.

Alternatively, the pistons 223_a_ to 223_d_ are replaced by membranes controlled by an electromagnetic device. Membrane pumps are then used.

Alternatively, a magnetic or ceramic micro-pump or a peristaltic micro-pump may be used in each injector 221_a_ to 221_d_.

Depending on the type of pump used in the injectors, and its withdrawal power, it is possible to do without the pumps 33_a_ to 33_d_, which are therefore optional, for example by placing the reservoirs 25_a_ to 25_d_ under a slight overpressure of several decibars with respect to the conduits 7 and 8, as considered above with a pressure exchanger.

Outlet valves made up of needles 222_a_ to 222_d_ are respectively arranged near and downstream from each corresponding injector 221_a_ to 221_d_, so as to close off the outlet orifice 226_a_ to 226_d_. Each needle 222_a_ to 222_d_ has a globally conical shape to come alongside a seat with a complementary shape that is formed at the corresponding outlet orifice 226_a_ to 226_d_.

Each needle 222_a_ to 222_d_ serves to allow or stop the fluid communication between the injector 221_a_ to 221_d_ and the nozzle 1.

The respective needles 222_a_ to 222_d_ of the injectors 221_a_ to 221_d_ are mounted in opposite directions relative to the needles 22_a_ to 22_d_ of the injectors 21_a_ to 21_d_. The needles 222_a_ to 222_d_ act as discharge valves, while the needles 22_a_ to 22_d_ of the injectors 21_a_ to 21_d_ act as opening valves of the respective chamber 21_a_ to 21_d_ with respect to the body 3. The needles 22_a_ to 22_d_ and 222_a_ to 222_d_ also perform a check function in the upstream direction.

Each injector 221_a_ to 221_d_ also includes a valve, such as the obturator 224_a_, arranged on the corresponding secondary conduit 23_a_ to 23_d_, so as to cut the supply. Such an obturator may also operate in suction. It advantageously forms a check valve.

During operation, when the piston 223_a_ has withdrawn to suction the active substance in the injector 221_a_, the obturator 224_a_ opens automatically. Then, when the piston 223_a_ moves forward within the injector 221_a_, toward the needle 222_a_, the obturator 224_a_ closes automatically.

When the active substance pressure in the injector 221_a_ exceeds the force due to the stiffness of a spraying 225_a_ returning the needle 222_a_ to the closed position, the latter part opens and the active substance is discharged outside the injector 221_a_ into the body 3 and toward the nozzle 1, without rising in the primary conduit 7 toward the primary vat 5, due to the presence of the check valve 203.

The injectors 221_a_ to 221_d_ have the same structure and operate in the same way as the injector 221_a_ described above.

Since the valve 207 and each pump can be actuated remotely, it is possible only to control the circulation of active substance and/or drive the spraying of liquid in the presence of plants to be treated.

The agricultural sprayer is triggered by signals detecting plants to be treated, which determine the spraying phases and/or active substance injection phases. Such signals may for example be generated by an image processing system processing images acquired by an onboard camera on the ramp or the agricultural vehicle. In this way, the spraying may be activated, nozzle by nozzle, only in the presence of plants to be treated, by actuating the valves 203, 207 and 224 and/or the injectors 21_a_ to 21_d_ or 221_a_ to 221_d_.

Likewise, the injection of active substance from each of the nozzles may be activated, deactivated, or dosed differently, depending on the state of the crop to be treated, for example by infrared imaging, or by the GPS position characterizing the shape and borders of the field, or a surface that has already been treated, or the proximity of a sensitive area to be respected. For example, in particular when a weed-killer is applied, the injection of active substance may depend on whether the plants to be treated are healthy or in poor health, which may be detected by infrared imaging. The control means, for example, a controller, therefore make it possible, using the injectors, to regulate the flow rate of active substance as a function of the state of the plant surface to be treated. Alternatively or additionally, these control means make it possible to regulate the flow rate of active substance as a function of the speed of movement of the sprayer, i.e. the speed of forward movement of a tractor supporting or pulling it.

Irrespective of the embodiment, the spraying assembly can thus operate by recirculation, in particular to keep the liquid in motion, even after its spraying has been partially or completely temporarily interrupted.

In all of the embodiments, in particular those illustrated, the spraying assembly according to the invention makes it possible to incorporate the active substance(s) into the liquid to be sprayed "at the last minute," i.e., just before actual spraying of that liquid.

It is therefore possible to adapt the dosing of active substance of the liquid to be sprayed instantaneously by controlling, in a suitable manner, i.e. complete, partial or proportional, the injectors 21_a_ to 21_d_ or 221_a_ to 221_d_, and consequently to avoid the overdoses or underdoses observed in the assemblies of the prior art.

In fact, the specific volume of each active substance injector 21_a_ to 21_d_ or 221_a_ to 221_d_ is not in permanent fluid communication with the mixing area of the body 3. Consequently, an injector 21/221, which is physically on the borderline and very close to the mixing chamber 3, which must be very small and turbulent to ensure good homogenization, does not cause inertia in the dosing of the mixture, which allows each nozzle 1 to make quick, even instantaneous, variations in the concentration of that mixture.

It is possible for the injectors 21_a_ to 21_d_ or 221_a_ to 221_d_ and/or the secondary pumps 33_a_ to 33_d_ also to be interfaced with any DPA regulating system of the pump 13, so as also to adapt the quantity of active substance incorporated into the liquid to be sprayed to the speed of movement of the sprayer.

The secondary vats 25_a_ to 25_d_ may either contain different mixtures or identical mixtures. In the latter case, it is possible to have a wider variation range for the quantity of a given active substance incorporated into the liquid to be sprayed.

This in fact makes it possible to adapt the quantity of active substance injected into the body 32 at an extended speed variation range of the sprayer for example situated between 3 and 30 km/h.

This may in particular be useful when the active substance(s) to be incorporated into the liquid to be sprayed in the body 3 are incompatible with the phytosanitary product conveyed by that liquid, by means of the pump 13 and the conduit 7, or when said active substance(s) must be incorporated into the liquid to be sprayed at a very small dose and/or only at certain moments.

Another advantage of the spraying assembly according to the invention lies in the fact that once the size of the drops of liquid to be sprayed by the nozzle 1 is chosen, in particular by acting on the liquid pressure in the primary conduit 7 and the type of nozzle, the incorporation of active substances using injectors 21 or 221, at the nozzle 1 or various segments of the ramp 9, has practically no effect on the size of those drops.

In fact, an assembly according to the invention, including used without DPA or pressure variation of the pump 13, implements means, for example, a regulator or valve, for maintaining the pressure of the liquid to be sprayed, which makes it possible to keep the size of the projected drops substantially constant. It is therefore possible to control this drop size, and consequently to optimize the adaptation of spraying to each category of plants.

Furthermore, such an assembly implements means making it possible to regulate the active substance flow rate, and therefore its concentration in the liquid to be sprayed, in proportion to the speed of forward movement of the ramp 9, without, however, altering the flow rate of that carrier liquid itself.

Aside from the size of the drops, which in this case is constant, the user can thus vary, as desired and potentially manually, the concentration of active substance, in a particularly precise and localized manner.

Furthermore, each pressure maintenance means and each means for regulating the flow rate can be actuated individually and independently, which allows "unitary" control of each injector and each nozzle independently of one another, which guarantees that the sprayer can be used flexibly and with a wide spectrum as to the plants to be treated.

According to one aspect of the invention which is optional and which is shown only in FIG. 1, the nozzle 1 comprises a ramp 400 for injecting air in countercurrent in the injectors 21*a* to 21*d*. More specifically, an air injector 401*a* belonging to the ramp 400 emerges in the injector 21*a* and is oriented toward the conduit 23*a*. Corresponding injectors belonging to the ramp 400 emerge in the other injectors. The ramp 400 is connected to a compressed air source S through a control valve 402.

Thus, at the end of a half-day or a full day of spraying, it is possible for the user to inject, in the injectors 21*a* to 21*d*, and countercurrent with respect to the normal direction of circulation of the liquid to be sprayed, a sufficient quantity of air to clean said injectors and push the products to be sprayed effectively toward the reservoirs 25*a* to 25*d*, through the conduits 23*a* to 23*d*, the obturators 24*a* to 24*d*, the pumps 33*a* to 33*d* and the conduits 27*a* to 27*d*. Thus, the products present in the injectors 21*a* to 21*d* and in their respective supply means may be recovered at the end of a spraying period. This operation also makes it possible to decrease the quantity of water or liquid product necessary to clean the injectors 21*a* to 21*d* and their means for supplying products to be sprayed at the end of a spraying operation.

A similar construction, with means for injecting air in countercurrent, may be adopted with the spraying assembly and the sprayer of FIG. 2.

Of course, the present invention is in no way limited to the example described above, which has been provided as an illustration and non-limitingly.

The invention claimed is:

1. A spraying assembly comprising:
- at least one spray nozzle for a liquid to be sprayed;
- at least one active substance injector for injecting an active substance into the liquid, the at least one injector having an outlet orifice;
- a pump or a pressurized reservoir supplying active substance to the at least one injector;
- a conduit connecting the at least one injector to the pump or pressurized reservoir;
- an obturator interposed on the conduit between the least one injector and the pump or pressurized reservoir;
- an outlet valve, located downstream of the injector and directly upstream of the nozzle, for each of the at least one injectors designed to close the outlet orifice of the injector;
- a spraying ramp;
- wherein the at least one nozzle and the at least one injector are mounted on a same body or two adjacent bodies;
- wherein the body or the two adjacent bodies define a chamber which communicates with the at least one nozzle and with the outlet orifice of the at least one active substance injector; and
- wherein the body or each body is mounted on the spraying ramp.

2. The assembly according to claim 1, wherein the each outlet valve is a needle adapted to come alongside a seat formed at the outlet orifice.

3. The assembly according to claim 1, wherein the at least one nozzle and the at least one injector are mounted on said same body or said two adjacent bodies, a mixture of the liquid to be sprayed with the active substance occurring through turbulence in the same body or the two adjacent bodies.

4. The assembly according to claim 1, wherein a plurality of active substance injectors are situated directly upstream from the at least one nozzle.

5. The assembly according to claim 4, further comprising a further ramp which includes a plurality of air injectors for injecting air into each of the plurality of active substance injectors supplied with active substance.

6. A method for cleaning a spraying assembly according to claim 5, comprising the steps of:
- injecting a quantity of air into each active substance injector in a direction countercurrent from a direction of flow of the active substance in the injector, and
- pushing part of the active substance that is present in the injector and upstream back toward the pump or pressurized reservoir for the active substance.

7. The assembly according to claim 1, further comprising a remote control for remotely controlling and actuating the at least one injector or each outlet valve.

8. The assembly according to claim 7, wherein the at least one injector includes a pump of ceramic, electromagnetic, piezoelectric or peristaltic type.

9. A sprayer comprising:
- at least one spraying assembly according to claim 1;
- at least one primary liquid conduit designed to supply the at least one nozzle with liquid to be sprayed, and
- at least one secondary conduit designed to supply the at least one injector with active sub stance.

10. The sprayer according to claim 9, wherein the at least one nozzle and the at least one injector are mounted on said same body or said two adjacent bodies, a mixture of the liquid to be sprayed with the active substance occurring through turbulence in the same body or the two adjacent bodies and wherein the at least one secondary conduit includes secondary conduits respectively supplying each of the at least one injectors.

11. The sprayer according to claim 9, further comprising at least one regulator for keeping the pressure of the liquid to be sprayed constant directly upstream of the at least one nozzle.

12. The sprayer according to claim 11, wherein a plurality of regulators maintain the pressure of the liquid to be sprayed by a plurality of nozzles, the plurality of regulators being actuated individually and independently of each other.

13. The sprayer according to claim 9, further comprising an assembly where the at least one nozzle and the at least one injector are mounted on said same body or said two adjacent bodies, a mixture of the liquid to be sprayed with the active substance occurring through turbulence in the same body or the two adjacent bodies, and a regulator for regulating the flow rate of active substance in the body or the two adjacent bodies.

14. The sprayer according to claim 13, wherein each regulator for regulating the flow rate can be actuated individually and independently.

15. The sprayer according to claim 9, further comprising a regulator adapted to regulate the flow rate of active substance in each of the at least one injectors as a function of a displacement speed of the sprayer or a state of a plant surface to be treated.

16. The sprayer according to claim 9 wherein the at least one injector includes a pump or a piezoelectric, electromagnetic or peristaltic valve, and the sprayer includes a controller adapted to vary an operating speed of the pump or the valve so as to drive a flow rate thereof.

17. The sprayer according to claim 9, wherein the at least one secondary conduit includes at least one secondary conduit adapted to convey a first type of active substance- or a plurality of secondary conduits adapted to convey a plurality of types of active substances.

18. The sprayer according to claim 17, wherein the first type of active substance is an herbicide and the second type of active substance is an insecticide, a fungicide, or a wetting agent.

19. The sprayer according to claim 9, wherein the at least one primary conduit includes at least one valve to control circulation of the liquid to be sprayed and the at least one secondary conduit includes at least one obturator to control circulation of the active substance, the at least one valve and the at least one obturator being able to be actuated remotely.

20. The spraying assembly of claim 1, wherein the sprayer is an agricultural sprayer.

21. A spraying assembly comprising:

a spray nozzle for spraying an active-substance-containing liquid on an agricultural product;

one or more active substance injectors for injecting active substances into a liquid to form the active-substance-containing liquid, each injector having an outlet orifice;

a respective pump or a respective pressurized reservoir connected to, and supplying active substance to, each of the one or more injectors by a respective conduit;

each conduit having an obturator interposed between said each respective injector and said each pump or pressurized reservoir;

a respective outlet valve located on an outlet side of each injector, for closing the outlet orifice of said each injector;

a spraying ramp;

wherein the nozzle and the one or more injectors are mounted on a same body, wherein said same body defines a chamber, the chamber having an outlet connected directly to the nozzle, the chamber having, for each of the one or more injectors, a respective inlet directly connected to the outlet orifice of said each injector, and having a further inlet connected to a source of the liquid, the active-substance-containing liquid being formed in the chamber; and wherein the body is mounted on the spraying ramp.

22. The spraying assembly of claim 21 further comprising a primary conduit, the primary conduit having an outlet connected to the further inlet, the primary conduit supplying the liquid to the chamber.

23. The spraying assembly of claim 21, further comprising a further pump or pressurized reservoir connected to the further inlet, for supplying the liquid to the primary conduit.

24. The spraying assembly of claim 23, wherein the further pump supplies the liquid at a constant pressure.

25. The spraying assembly of claim 21, wherein the one or more active substance injectors include a plurality of active substance injectors.

26. A spraying assembly comprising: a spraying ramp;

a body or two adjacent bodies, the body or the two adjacent bodies being mounted on the spraying ramp, the body or the two adjacent bodies defining a chamber;

at least one spray nozzle for spraying a liquid mounted on the body or one of the two adjacent bodies and communicating with the chamber;

at least one injector valve for injecting an active substance into the liquid mounted on the body or one of the two adjacent bodies, the at least one injector valve situated directly upstream from the at least one nozzle and communicating with the chamber, wherein the at least on injector valve includes a needle for controlling fluid communication with the chamber;

a pump or a pressurized reservoir supplying active substance to the at least one injector valve;

a conduit connecting the at least one injector valve to the pump or pressurized reservoir; and an obturator interposed on the conduit between the least one injector valve and the pump or pressurized reservoir.

27. The spraying assembly of claim 26, wherein the needle is upstream of the chamber.

28. The spraying assembly of claim 26, wherein the sprayer is an agricultural sprayer.

* * * * *